United States Patent
Ederyd et al.

(10) Patent No.: US 6,609,953 B2
(45) Date of Patent: Aug. 26, 2003

(54) SEAL RINGS WITH IMPROVED FRICTION AND WEAR PROPERTIES

(75) Inventors: Stefan Ederyd, Saltsjö-boo (SE); Håkan Engqvist, Uppsala (SE); Niklas Axén, Järlåsa (SE)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 10/322,459

(22) Filed: Dec. 19, 2002

(65) Prior Publication Data

US 2003/0109199 A1 Jun. 12, 2003

Related U.S. Application Data

(62) Division of application No. 09/678,740, filed on Oct. 4, 2000, now Pat. No. 6,541,135.

(30) Foreign Application Priority Data

Jun. 10, 2000 (SE) .............................................. 9903600

(51) Int. Cl.⁷ .................................................. B24B 1/00
(52) U.S. Cl. ......................................... 451/28; 451/41
(58) Field of Search .............................. 451/28, 41, 63

(56) References Cited

U.S. PATENT DOCUMENTS

| | | |
|---|---|---|
| 3,647,401 A | 3/1972 | Meadows |
| 4,517,726 A | 5/1985 | Yokoshima et al. |
| 5,580,666 A | 12/1996 | Dubensky et al. |
| 5,619,000 A | 4/1997 | Ederyd et al. |
| 5,648,119 A * | 7/1997 | Grab et al. ............ 427/249.13 |
| 5,650,059 A * | 7/1997 | Shumaker et al. .......... 205/640 |
| 6,200,524 B1 | 3/2001 | Griskin et al. |
| 6,228,483 B1 | 5/2001 | Sarin |

FOREIGN PATENT DOCUMENTS

| | | |
|---|---|---|
| DE | 23 58 928 A1 | 5/1975 |
| JP | 59144861 | 8/1984 |
| JP | 3128103 | 5/1991 |
| JP | 9-300197 | 11/1997 |

\* cited by examiner

Primary Examiner—Joseph J. Hail, III
Assistant Examiner—Hadi Shakeri
(74) Attorney, Agent, or Firm—Burns, Doane, Swecker & Mathis, L.L.P.

(57) ABSTRACT

The present invention relates to a cemented carbide wear part with a wear surface with improved friction and wear properties. This has been obtained by providing the wear surface with a surface layer with a thickness of 0.5 $\mu$m to 25 $\mu$m, preferably 1 to 10 $\mu$m with an average WC grain size of less than 500 nm. The surface layer is obtained by lapping the wear surface with an abrasive disc for at least 10 minutes at 1000 to 3000 rpm at a pressure of 0.1 to 0.5 MPa preferably without any grinding media.

7 Claims, 3 Drawing Sheets

SEAL RINGS WITH IMPROVED FRICTION AND WEAR PROPERTIES

This application is a divisional of application Ser. No. 09/678,740, filed on Oct. 4, 2000 U.S. Pat. No. 6,541,135.

FIELD OF THE INVENTION

The present invention relates to cemented carbide wear parts particularly useful in demanding wear parts applications used during sliding at high pressure and high sliding speed including seal rings with improved friction and wear properties.

BACKGROUND OF THE INVENTION

Cemented carbides, particularly WC—Co, WC—TiC—Co, WC—TaC—Co, WC—TiC—TaC—Co materials, find many applications in the field of wear parts. This is linked to their outstanding mechanical properties, e.g. a unique combination of hardness and toughness resulting in high wear resistance, low friction and high thermal conductivity.

Cemented carbides with a very fine grain size, often referred to as nanocrystalline structure, i.e. with carbide grains in the order of nanometers in size, show better mechanical properties than conventional, coarse grained materials. Although nanocrystalline cemented carbides have been manufactured, problems in their production make them expensive.

There are however several examples of applications where nanocrystalline materials are very interesting candidates, such as metal cutting inserts, wood cutting teeth, etc.

An industrially important example is cemented carbides used in seal rings for pumps working under heavy-duty conditions, such as drainage pumps and seawater pumps. The seal ring package, as shown for example, FIG. 1, is often left on the shelf for a prolonged prior of time before use, resulting in a joining OR or sticking together of the seal rings caused by the surrounding air, which causes severe seal/pump damage during the starting up moment as a result. Also the running-in period of the seal ring package or the bearing package could give problems in applications with high demands on the friction and wear properties. An early fracture of the cemented carbide in the seal surface can totally destroy the seal surface. In some applications it is therefore necessary to use a combination of two types of materials in the seal rings, e.g. hard sintered SiC against cemented carbide. Such material combinations put high demands on the surface hardness and the friction properties of the softer cemented carbide.

SUMMARY OF THE INVENTION

An interesting alternative to the manufacture of entirely nanocrystalline parts would be the creation of nanocrystalline surface layers on parts with a bulk of conventional coarse grained cemented carbides.

In acidic environments the corrosion resistance of Co is low. By replacing Co with another more corrosion resistant metal, e.g. Cr, Ni or Mo or combinations thereof, the corrosion resistance of the material is increased. An alternative to the manufacture of parts with the entire material based on corrosion resistant metal would be the creation of a surface layer consisting of WC and a corrosion resistant metal mixed with Co.

In a first aspect, the present invention provides a cemented carbide wear part with a wear surface based on WC and a binder phase of Co, Ni and/or Fe, wherein said wear surface comprises a surface layer with a thickness of 0.5 μm to 25 μm and an average grain size less than 500 nm.

In a second aspect, the present invention provides a method of making a cemented carbide wear part with a wear surface, the method comprising: lapping the wear surface with an abrasive disc for at least 10 minutes at 1000 to 3000 rpm with an abrasive disc at a pressure of 0.1 to 0.5 MPa

DETAILED DESCRIPTION OF THE OF THE INVENTION

Figure 1:
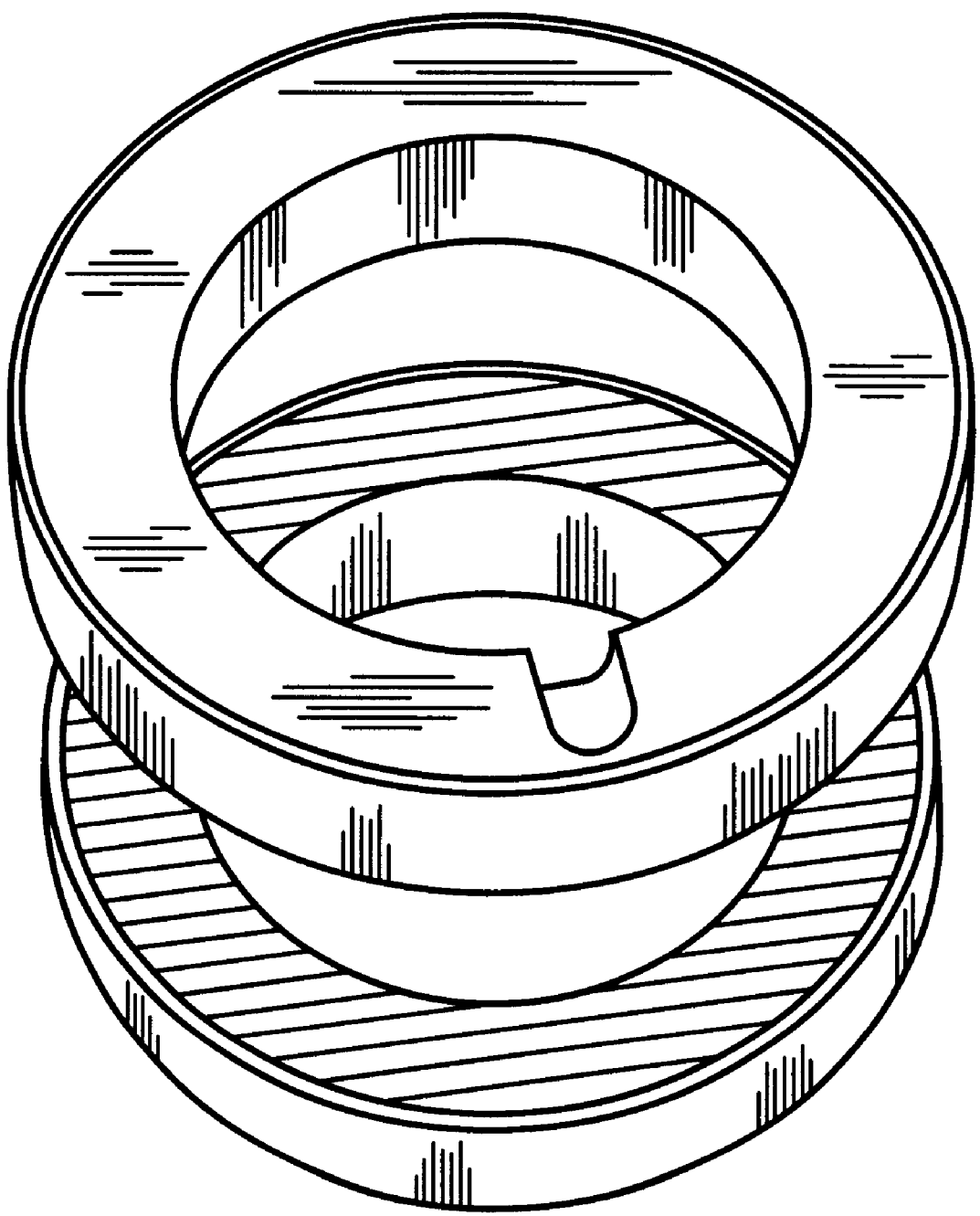
FIG. 1 shows a seal ring package.

According to the invention seal rings with improved properties have been obtained by treatment of the seal surfaces with a lapping process. Surprisingly it was found that during the surface treatment the outer surface portion of the seal ring surface transforms to a hard and wear resistant layer of a very fine grained structure with excellent friction properties.

According to the present invention there is provided a seal ring with a surface layer on the seal surface with a thickness of 0.5 μm to 25 μm, preferably 1 to 10 μm. The seal ring consists of WC, and 4 to 15%, preferably 5 to 12 weight-% Co, Ni and/or Fe. Additions of a few percent of Cr and/or Mo are present in the binder phase at least in the surface layer. The WC grain size is 2 to 6 μm. Up to 5% of cubic carbides such as TiC, TaC, NbC can be present in the cemented carbide. Alternatively, the seal ring is made of binderless cemented carbides containing <1 wt-% Co and/or Ni and/or Fe.

In one embodiment the outermost part of the layer consists essentially of very fine grained WC which is less than 500 nm, preferably less than 200 nm, and most preferably about 100 nm in average grain size; and 1 to 25 vol-%, preferably 5 to 12 vol-%, of about 10 nm of oxidized crystallites such as $CaWO_4$, $WO_3$ or $CoWO_4$.

In a second embodiment the layer also contains hydroxides of the binder phase metals.

In a third embodiment there are no oxides or hydroxides at all.

In all three embodiments the binder phase content of the sealing surface layer is essentially the same or somewhat higher as in the interior portion of the seal ring.

According to the method of the present invention the cemented carbide seal rings are lapped on the seal surfaces with abrasive discs such as of pure sintered alumina, SiC, or diamond for at least 10 minutes at 1000 to 3000 rpm at a pressure of 0.1 to 0.5 MPa preferably without any grinding media. Preferably a lapping liquid of 10 to 25% of CaOH at a pH level of 8 to 9 is used. Also B, S and/or metals such as Cr and Mo can be present as suitable soluble salts.

Alternatively, the method may be carried out with an addition of corrosion resistant metal(s) at the surface, e.g. by using known deposition methods such as PVD, CVD, or by covering the surface with small amounts of metal powder prior to the lapping treatment in order to obtain the fine grained surface layer.

The process may also be carried out in gases not resulting in any oxidation of the material, such as Ar or $N_2$. In nitrogen, only small amounts of nitrides are formed.

The treatment can be performed by other methods such as brushing with grinding media of diamond, alumina or SiC.

Alternatively cemented carbide rings can be used instead of the ceramic disc mentioned above.

The invention has been described with reference to seal rings but it is obvious that it can be applied also to other wear part applications, including those with high speed sliding and high surface pressure with high demands on the sliding properties, such as bearings, e.g. bearings in LdPE (Low density polyethylene) reactors.

The invention will now be further described by reference to the following examples, which are intended to be illustrative rather than restrictive.

EXAMPLE 1

Cemented carbide seal rings with an OD of 55 mm and composition of 6 weight-% Co and WC, with a grain size about 5 $\mu$m, were lapped with a pure alumina ceramic disc as sliding counterpart for 30 minutes in air without addition of any grinding media. The surface pressure during the lapping procedure was about 0.2 MPa at a rotating speed of 2000 rpm. After the treatment the rings had a covering layer of 3 $\mu$m thickness of nanocrystalline WC and a mixture of Co and $Al_2O_3$. The amount of alumina in the surface composite was minor. Small amounts of $WO_3$ and $CoWO_4$ were also present according to XRD analyses of the surface layer.

EXAMPLE 2

Figure 2:
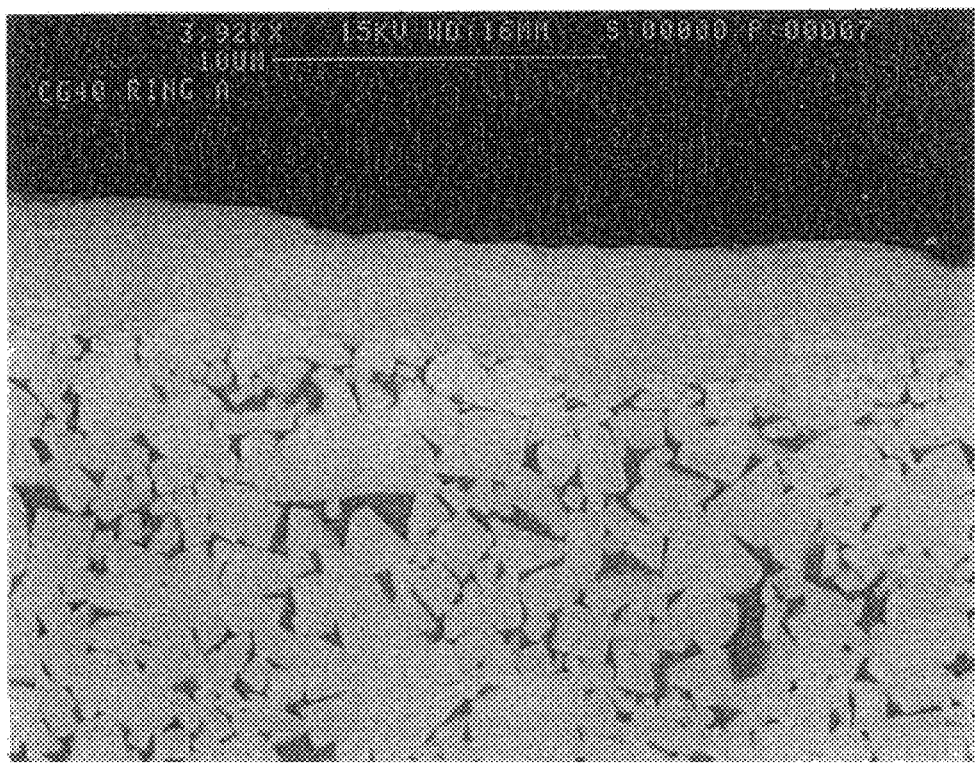
FIG. 2 is a SEM-micrograph in 4000x of a surface layer according to the invention.

Two self-mated cemented carbide seal rings with a OD of 55 mm with a composition of 6 weight-% Co and a WC with a grain size of about 5 $\mu$m, were rotated relative to each other, one in a stationary position, with surface pressures of about 0.2 MPa. The rings were rotated for 15 minutes, rotating speed of 2000 rpm without any addition of grinding media. After the treatment the rings had a completely covering layer of 4 $\mu$m thickness of nanocrystalline WC and Co, as illustrated in FIG. 2. Small amounts of $WO_3$ and $CoWO_4$ were also present in the surface layer.

EXAMPLE 3

Two self-mated flat cemented carbide rings with an OD of 55 mm and a composition of 6 weight-% Co and a WC with a grain size of about 5 $\mu$m and with a dull surface smoothness, were rotated relative to each other, one in a stationary position, with surface pressures of about 0.2 Mpa. The test was performed with a chamber filled with nitrogen gas surrounding the rotating rings. The rings were rotated for 15 minutes with a rotating speed of 2000 rpm without any addition of grinding media. After the treatment the rings had a covering layer of 3 $\mu$m thickness of nanocrystalline WC and Co. No oxides could be detected in the layer and only small amount of nitrides.

EXAMPLE 4

Two self-mated flat cemented carbide rings with an OD of 55 mm and a composition of 6 weight-% Co and a WC with a grain size of about 5 $\mu$m, were rotated relative to each other, one in a stationary position, with surface pressures of about 0.2 MPa. Before testing the stationary ring was coated with a 100 nm thick PVD surface layer of Cr. The rings were rotated for 15 minutes with a rotating speed of 2000 rpm without any addition of grinding media. After the treatment the rings had a completely covering layer of 2 $\mu$m thickness of nanocrystalline WC, Cr and Co. Small amounts of $WO_3$, Cr-oxides and mixed oxides of W—Co—Cr were also present in the surface layer.

EXAMPLE 5

Two self-mated flat cemented carbide rings with an OD of 55 mm and a cemented carbide composition of 6 weight-% Ni and WC, with a grain size of about 5 $\mu$m, were rotated relative to each other, one in a stationary position, with surface pressures of about 0.2 MPa. Before testing the stationary ring was covered with about 1 mg of Cr powder. The rings were rotated for 15 minutes with a rotating speed of 2000 rpm without any addition of grinding media. After the treatment the rings had a covering layer of 1–3 $\mu$m thickness of nanocrystalline WC, Cr and Ni. Small amounts of $WO_3$ Cr-oxides and oxide mixtures of W—Ni—Cr were also present in the surface layer.

EXAMPLE 6

Two self-mated cemented carbide seal with an OD of 55 mm and a cemented carbide composition of 6 weight-% Ni and a WC, with a grain size of about 5 $\mu$m, were rotated relative to each other, one in a stationary position, with surface pressures of about 0.2 MPa. The rings were rotated for 15 minutes with a rotating speed of 2000 rpm without any addition of grinding media. After the treatment the rings had a covering layer of 1–2 $\mu$m thickness of nanocrystalline WC and Ni. Small amounts of $WO_3$ were also present in the surface layer.

EXAMPLE 7

The initial friction coefficient for two self-mated cemented carbide rings according to prior art was 0.4 at a pressure of 300 kPa. Two seal rings according to Example 2 showed an initial friction coefficient of 0.17 in the same test.

EXAMPLE 8

Two self-mated cemented carbide rings according to prior art showed a regularly spaced crack pattern after sliding in water lubricated contact for 700 hours at 3 kPa. Two self-mated cemented carbides rings according to Example 6 did not show any cracks after running for 700 hours at the same conditions.

EXAMPLE 9

Figure 3:
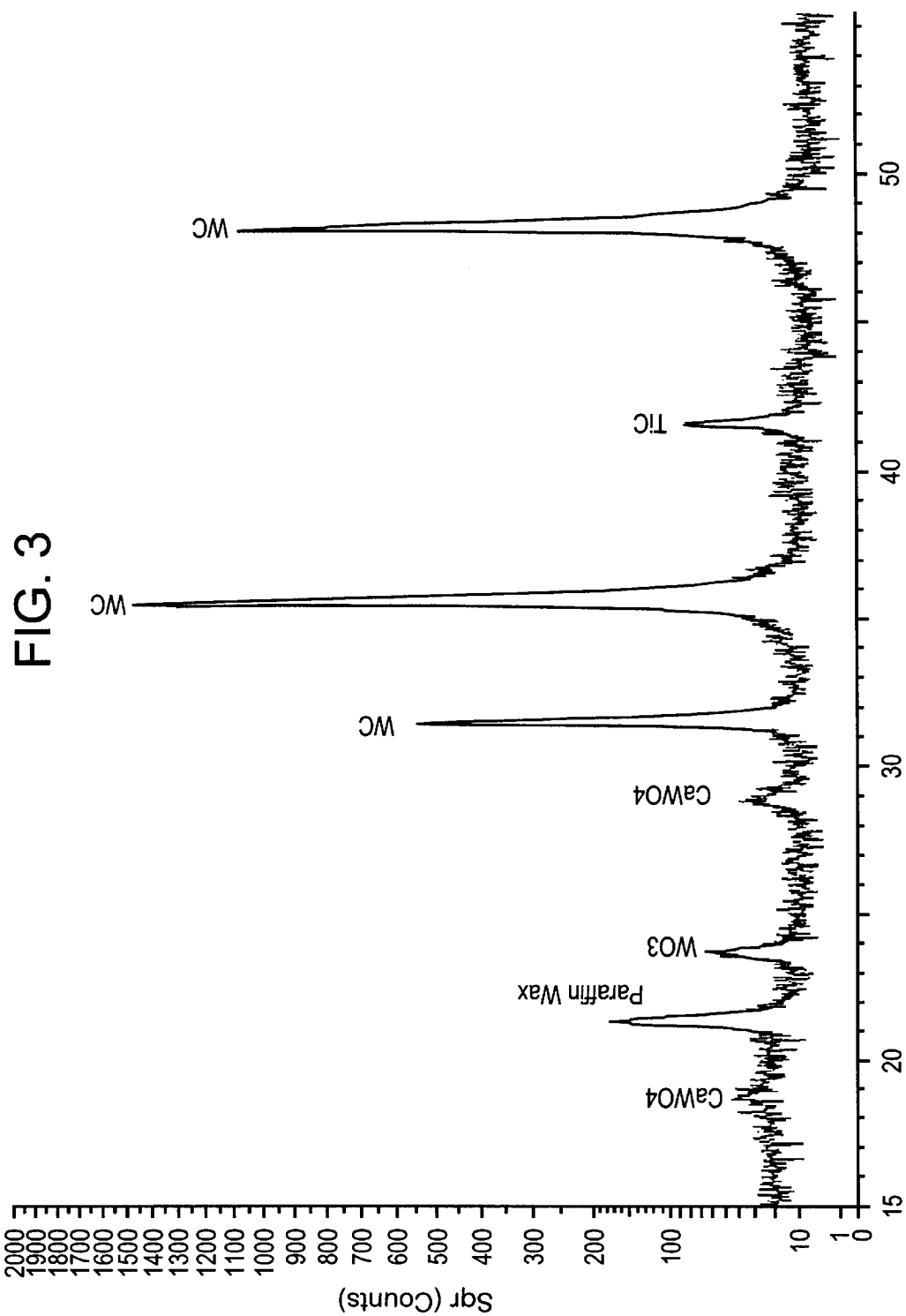
FIG. 3 shows an XRD diffraction pattern from a seal surface according to the invention.

Two self-mated flat rings of "Binderless" WC-MeC grade with an OD of 55 mm and a composition of, in addition to WC, 3 weight-% TiC, 1.5 weight-% TaC, 0.5 weight-% NbC and 0.5 weight-% Co and a WC grain size of about 3 $\mu$m, were rotated relative to each other, one in a stationary position, with surface pressures of about 0.2 MPa. During testing the chamber of the rings was filled with a CaOH solution with pH=8. The rings were rotated for 15 minutes with a rotating speed of 2000 rpm without any addition of grinding media. After the treatment the rings had a covering layer of 2 $\mu$m thickness of nanocrystalline WC, TiC, $CaWO_4$ and $WO_3$ according to XRD analysis, as illustrated in FIG. 3.

EXAMPLE 10

A comparison with seal rings according to prior art was performed in a qualification procedure. Test conditions were as follows:

| | |
|---|---|
| Medium on the pressure side: | Water |
| Medium at the Atm. side: | Dry |
| Rotating speed: | 300 rpm |
| Seal ring pressure (MPa): | 0.4 |
| Temp. (°C.): | 40 |
| Time (h): | 800 |

The seal surface on the rings according to prior art had smooth shiny surface. The rings according to the invention (example 6) had a flat and dull seal surface.

The rings according to the invention performed very well with a light running during the whole test period. No early fractures were observed.

The rings according to prior art were stopped after 12 hours because of high friction and hazardous running conditions. Early fractures with cracks and chipping of the cemented carbide from the surface occurred.

Although this invention has been illustrated and described in accordance with certain preferred embodiments, it is recognized that the scope of this invention is to be determined by the following claims.

We claim:

1. A method of making a cemented carbide wear part with a wear surface, the method comprising:
   lapping the wear surface with an abrasive disc for at least 10 minutes at 1000 to 3000 rpm with an abrasive disc at a pressure of 0.1 to 0.5 MPa.

2. The method according to claim 1, further comprising lapping using lapping liquid containing 10 to 25% CaOH at a pH level of 8 to 9.

3. The method according claim 2, wherein the lapping liquid further comprises B, S, and/or Cr and/or Mo present as suitable soluble salt.

4. The method according to claim 1, further comprising applying corrosion resistant metal(s) at the surface prior to lapping.

5. The method according to claim 1, wherein said abrasive disc comprises a cemented carbide ring.

6. The method according to claim 1, wherein said lapping is performed without grinding media.

7. The method of claim 4, wherein said corrosion resistant metal is applied by CVD, PVD or by covering the surface with metal powder.

* * * * *